(12) United States Patent
Inoue et al.

(10) Patent No.: US 8,860,860 B2
(45) Date of Patent: Oct. 14, 2014

(54) PHOTOELECTRIC-CONVERSION DEVICE, FOCUS DETECTION APPARATUS, AND IMAGE-PICKUP SYSTEM FOR PERFORMING AN OPERATION TO MONITOR AN AMOUNT OF LIGHT

(75) Inventors: Daisuke Inoue, Ebina (JP); Tomohisa Kinugasa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 932 days.

(21) Appl. No.: 12/959,093

(22) Filed: Dec. 2, 2010

(65) Prior Publication Data

US 2011/0134286 A1 Jun. 9, 2011

(30) Foreign Application Priority Data

Dec. 3, 2009 (JP) ................... 2009-275913
Aug. 18, 2010 (JP) ................... 2010-183050

(51) Int. Cl.
*H04N 3/14* (2006.01)
*H04N 5/335* (2011.01)
*G03B 13/00* (2006.01)
*H04N 5/232* (2006.01)
*H04N 5/3745* (2011.01)
*H04N 5/355* (2011.01)
*H04N 5/235* (2006.01)
*H04N 5/357* (2011.01)

(52) U.S. Cl.
CPC ......... *H04N 5/3575* (2013.01); *H04N 5/37452* (2013.01); *H04N 5/3559* (2013.01); *H04N 5/2351* (2013.01); *H04N 5/23212* (2013.01)
USPC .......................................... 348/297; 348/349

(58) Field of Classification Search
None
See application file for complete search history.

(56) References Cited

U.S. PATENT DOCUMENTS

| | | | | |
|---|---|---|---|---|
| 6,147,338 A | * | 11/2000 | Takahashi | 250/208.1 |
| 6,781,624 B1 | * | 8/2004 | Takahashi | 348/241 |
| 6,850,278 B1 | | 2/2005 | Sakurai | |
| 7,327,393 B2 | * | 2/2008 | Ying et al. | 348/308 |
| 2004/0079977 A1 | | 4/2004 | Ying | |
| 2006/0050163 A1 | * | 3/2006 | Wang et al. | 348/308 |
| 2008/0002958 A1 | * | 1/2008 | Inoue et al. | 396/96 |
| 2008/0266434 A1 | | 10/2008 | Sugawa | |
| 2009/0128677 A1 | * | 5/2009 | Kozlowski | 348/308 |
| 2011/0134272 A1 | * | 6/2011 | Kinugasa | 348/222.1 |

FOREIGN PATENT DOCUMENTS

| | | |
|---|---|---|
| EP | 977427 A2 | 2/2000 |
| JP | H09-200614 A | 7/1997 |
| JP | H09-274133 A | 10/1997 |
| JP | 2000-050164 A | 2/2000 |
| JP | 2000-078473 A | 3/2000 |
| JP | 2005-328493 A | 11/2005 |
| JP | 2006-319529 A | 11/2006 |

\* cited by examiner

*Primary Examiner* — Justin P Misleh
(74) *Attorney, Agent, or Firm* — Canon USA, Inc. IP Division

(57) ABSTRACT

A photoelectric-conversion device that allows for both of widening the dynamic range and performing an operation to monitor the amount of received light is achieved. A sensor-cell unit that can operate in low-sensitivity mode and high-sensitivity mode, a transfer unit transferring a signal outputted from a unit pixel, and a monitoring unit monitoring a signal transmitted from the sensor-cell unit, the signal being output from the transfer unit, are provided.

20 Claims, 13 Drawing Sheets

PHOTOELECTRIC-CONVERSION DEVICE, FOCUS DETECTION APPARATUS, AND IMAGE-PICKUP SYSTEM FOR PERFORMING AN OPERATION TO MONITOR AN AMOUNT OF LIGHT

BACKGROUND OF THE INVENTION

1. Field of the Invention

The present invention relates to a photoelectric-conversion device, and particularly relates to a photoelectric-conversion device performing a phase-difference detection-type auto focusing (AF).

2. Description of the Related Art

A phase-difference detection-type focus detection apparatus realizes the AF by calculating the defocus amount of a subject (the amount of deviation from the focus point) by performing the correlation calculation for signals that are obtained through a couple of line sensors and obtaining focusing by feeding the defocus amount to the operation of an optical system. At that time, the amount of signal accumulated in a sensor should be monitored in real time, so as to change the accumulation period based on the amount of received light. The above-described configuration is exemplarily disclosed in Japanese Patent Laid-Open No. 2000-050164.

Japanese Patent Laid-Open No. 2005-328493 exemplarily discloses a configuration where a photodiode is connected to a capacitance element accumulating a photoelectric charge overflowing from the photodiode via a transistor to widen the dynamic range while maintaining a high S/N ratio.

However, performing the monitoring operation in real time while widening the dynamic range is not considered in each of the configurations that are disclosed in Japanese Patent Laid-Open No. 2000-050164 and Japanese Patent Laid-Open No. 2005-328493.

SUMMARY OF THE INVENTION

According to one aspect of the present invention, a device includes a plurality of unit pixels including a sensor-cell unit configured to output a signal obtained by photoelectric conversion and selectively operate in low-sensitivity mode and high-sensitivity mode, a plurality of transfer units configured to transfer a signal output from a unit pixel, and a monitoring unit configured to monitor the transferred signal.

Further features of the present invention will become apparent from the following description of exemplary embodiments with reference to the attached drawings.

DESCRIPTION OF THE EMBODIMENTS

First Embodiment

A first embodiment of the present invention will be described with reference to the attached drawings. The first embodiment is exemplarily used for a photoelectric-conversion device provided to perform the phase-difference auto focusing (AF).

Figure 1:
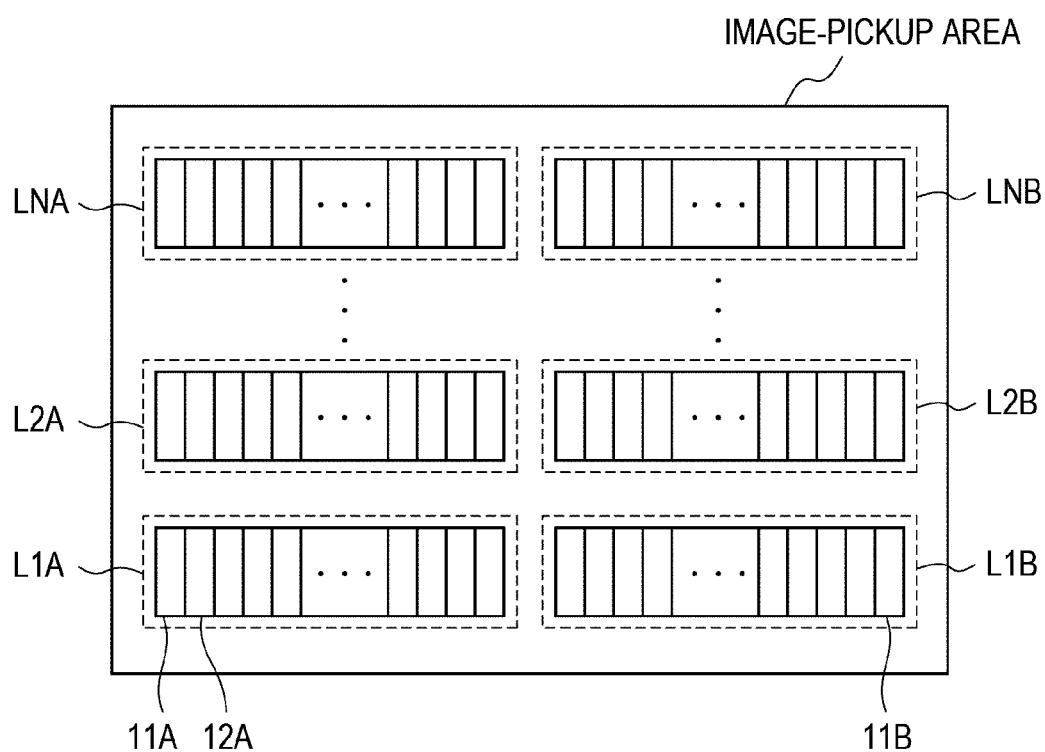
FIG. 1 schematically illustrates an image-pickup area provided in a phase-difference AF photoelectric-conversion device according to a first embodiment of the present invention.

FIG. 1 schematically illustrates an image-pickup area provided in the phase-difference AF photoelectric-conversion device. Pairs of line-sensor portions L1A and L1B, L2A and L2B, . . . , and LNA and LNB are provided on the image-pickup area. A pair of the line-sensor portions is used to measure the defocus amount of a subject, which is observed in a given region of the image-pickup area. At least two pairs of the line-sensor portions are arranged to provide at least two range-finding points so that the AF precision is increased. Each of the line-sensor portions includes unit pixels 11A, 12A, and so forth that can operate in low-sensitivity mode and high-sensitivity mode. The level of a signal output for the same incident-light amount in the low-sensitivity mode is lower than that attained in the high-sensitivity mode. Transfer units 21A, 22A, . . . , 21B, 22B, and so forth are provided for the line-sensor portions, and a signal output from the transfer unit is monitored through a monitoring unit 30.

Figure 2:
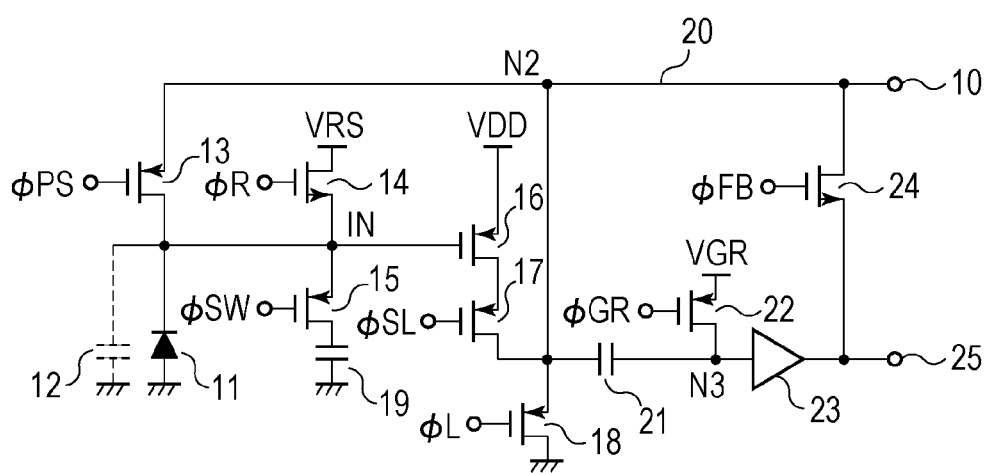
FIG. 2 is a circuit diagram illustrating an exemplary configuration of a unit pixel according to the first embodiment.

FIG. 2 is a circuit diagram illustrating an exemplary configuration of each of the unit pixel of the line-sensor portion illustrated in FIG. 1 and the transfer unit provided for the above-described unit pixel.

The unit pixel includes metal oxide semiconductor (MOS) transistors 13, 14, 15, 16, 17, and 18, and a capacitance element 19 in addition to a photodiode (hereinafter referred to as a PD) 11 and a parasitic capacitance 12 accompanying the PD 11.

An electrical charge generated in response to light received by the PD 11 is accumulated in the parasitic capacitance 12. The parasitic capacitance 12 operates as a detection capacitance provided to convert an electrical-charge amount generated by the PD 11 into a voltage signal. When the MOS transistor 17 is brought into conduction in response to a signal φSL, the MOS transistor 16 operates as an inverting amplifier with a gain of −1 while using the MOS transistor 18 controlled based on a signal φL as a load. The MOS transistor 13 changes the conduction between a node N1 provided as a common node of the cathode of the PD 11 and the input terminal of the MOS transistor 16, and a node N2 provided as a common node of the MOS transistors 17 and 18 based on the signal φPS. One of terminals of the MOS transistor 14 is connected to the node N1 and the other terminal is connected to a power voltage VRS. Upon being brought into conduction based on a signal φR, the MOS transistor 14 resets the node N1 based on the power voltage VRS. One of terminals of the MOS transistor 15 is connected to the node N1 and the other terminal is connected to the capacitance element 19. When the MOS transistor 15 is brought into conduction based on a signal φSW, the capacitance element 19 is connected to the node N1, thus increasing the detecting capacitance together with the parasitic capacitance 12. In the present embodiment, high-sensitivity mode is determined to be the state where a charge/voltage-conversion coefficient is increased due to the decrease of the detecting caused by the off state of the MOS transistor 15. Further, low-sensitivity mode is determined to be the state where the charge/voltage-conversion coefficient is decreased due to the increase of the detecting capacitance caused by the on state of the MOS transistor 15.

The transfer unit includes a clamp capacitance 21, MOS transistors 22 and 24, and an amplifier 23. The clamp capacitance 21 and the MOS transistor 22 controlled based on a signal φGR are included in a clamp circuit and reduce a noise component occurring in a sensor-cell unit. In the present embodiment, the amplifier 23 is a source-follower circuit with a gain of 1. The input of the source-follower circuit is the control electrode of an n-channel metal-oxide semiconductor (NMOS) transistor (not shown). When the threshold-value voltage of the above-described NMOS transistor is determined to be Vth, it is determined that the relationship between a voltage VGR provided to the MOS transistor 22 and a voltage VRS provided to the MOS transistor 14 is expressed by the equation VGR−Vth=VRS. The MOS transistor 24 is controlled based on a signal φFB. Upon being brought into conduction, the MOS transistor 24 connects the output terminal of the amplifier 23 to the node N2.

Figure 3:
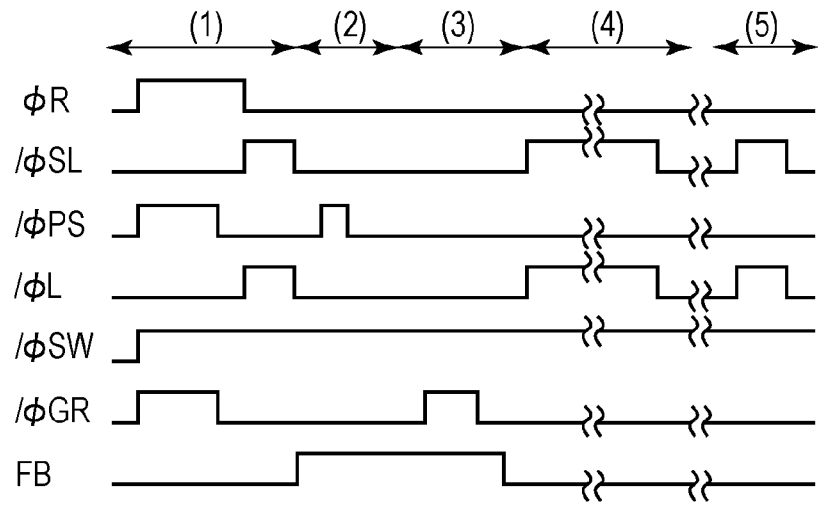
FIG. 3 is a circuit diagram illustrating the photoelectric-conversion device according to the first embodiment, where the photoelectric-conversion device is exemplarily driven in low-sensitivity mode.

Operations that are performed in the low-sensitivity mode according to the present embodiment will be described with reference to FIG. 3. The names of signals that are illustrated in FIG. 3 correspond to those of the individual signals that are illustrated in FIG. 2. A signal designated by the sign "/" denotes an inverted signal. Here, when each of the signals that are illustrated in FIG. 3 is in a high level, the MOS transistor corresponding to the signal is brought into conduction.

The signal φSW is maintained at a high level in the low-sensitivity mode. Therefore, the low-sensitivity mode is the state where the detection capacitance of the sensor-cell unit is increased.

In a period (1), signals φR and /φPS are raised to a high level, and the nodes N1 and N2 are reset. Since the signal φGR is also raised to a high level, the clamp capacitance 21 is reset based on the voltages VRS and VGR. Lowering of the signals /φPS and /φGR to a low level follows, causing the voltage corresponding to the difference between the voltages VRS and VGR to be retained in the clamp capacitance. When the signal φR is subsequently lowered to a low level, the reset state of the node N1, that is, that of the PD 11 connected to the node N1 is released, and an electrical-charge accumulation operation is started. When the signals /φSL and φL are temporarily raised to a high level subsequent to the electrical-charge accumulation operation, a sensor noise Ns occurring due to the reset of the sensor-cell unit is output to the clamp capacitance 21.

In a period (2), the signal φFB is raised to a high level, and an output signal of the amplifier 23 is fed back to the node N2. Since the signal /φPS is temporarily raised to a high level in the period (2), a noise Ns+Nt obtained by superimposing a noise Nt occurring in the transfer unit on the sensor noise Ns relative to the voltage VRS is provided to each of the parasitic capacitance 12, the capacitance element 19, and the clamp capacitance 21.

In a period (3), the signal /φGR is raised to a high level and the node N3 is reset again based on the voltage VGR. Since the signal /φFB is on the high level in that period, the clamp capacitance is reset based on a voltage expressed by the equation VGR−Vth=VRS and the voltage VGR.

In a period (4), the signal amount is monitored through the above-described monitoring unit 30. When each of the signals /φSL and /φL is raised to a high level, an output signal of the sensor-cell unit, which appears at the node N2, is expressed as −(S+Nt) attained by superimposing the sensor noise Ns on −(S+Ns+Nt), where the sign S denotes a signal component obtained through photoelectric conversion. The sign "−" indicates that the inverting amplifier has a gain of −1. Consequently, the node N3 is expressed as VGR−(S+Nt). Therefore, the noise Nt of the transfer unit is superimposed on VGR−(S+Nt) and an output signal of the amplifier 23 is expressed as VGR−S. That is, an output signal expressed as −S relative to the VGR is output from an OUT 25. The output signal of the OUT 25 is transmitted to the monitoring unit 30 and an automatic gain control (AGC) operation, which is performed to determine a gain for a signal, is performed based on the contrast between the output signal of the OUT 25 and that of another sensor-cell unit of the line-sensor unit. Further, the monitoring unit 30 monitors the amount of signal accumulated in the sensor-cell unit and outputs a signal to instruct the sensor-cell unit to end the accumulation operation when the signal amount exceeds a predetermined threshold value.

In a period (5), the signals /φSL and /φL are raised to a high level so that an operation is performed to output signal components −S from an OUT 10 in sequence.

Figure 4:
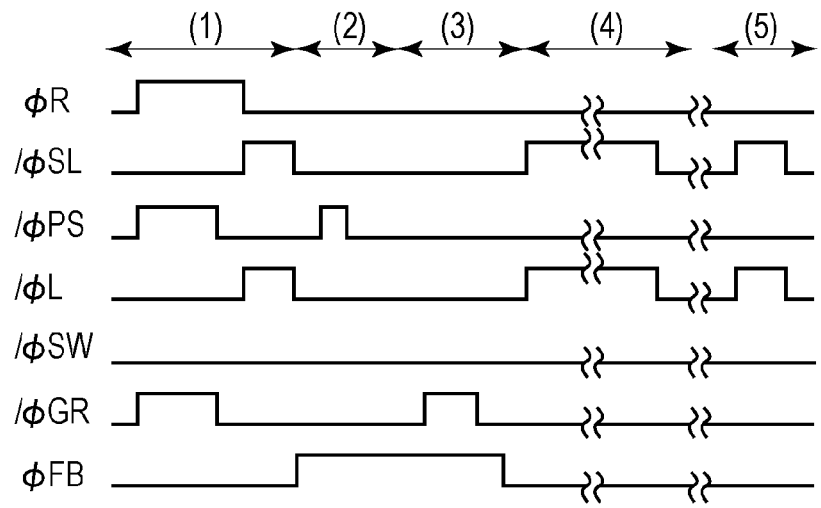
FIG. 4 is a circuit diagram illustrating the photoelectric-conversion device according to the first embodiment, where the photoelectric-conversion device is exemplarily driven in high-sensitivity mode.

Although the operations of the low-sensitivity mode have been described, operations of the high-sensitivity mode will now be described. The difference between the operation timing illustrated in FIG. 4 and that illustrated in FIG. 3 is that the signal /φSW is fixed at a low level in the high-sensitivity mode. Since the operations of the high-sensitivity mode are equivalent to those performed in the low-sensitivity mode except for that mentioned above, further description of the operations of the high-sensitivity mode will be omitted.

Thus, the present embodiment allows for changing the sensitivity of the sensor-cell unit based on the brightness of a subject and controlling the accumulation period by monitoring the signal level. Further, according to the present embodiment, the transfer unit includes the clamp circuit, the noise of the sensor-cell unit can be reduced, and a feedback path is provided to feed an output signal of the transfer unit back to the sensor-cell unit, which makes it possible to output a signal with a reduced noise of the transfer unit. The above-described configuration allows for detecting a signal with precision.

Second Embodiment

A second embodiment of the present invention will be described with reference to the attached drawings. The second embodiment provides a photoelectric-conversion device including a memory-cell unit in addition to the sensor-cell unit and the transfer unit.

Figure 5:
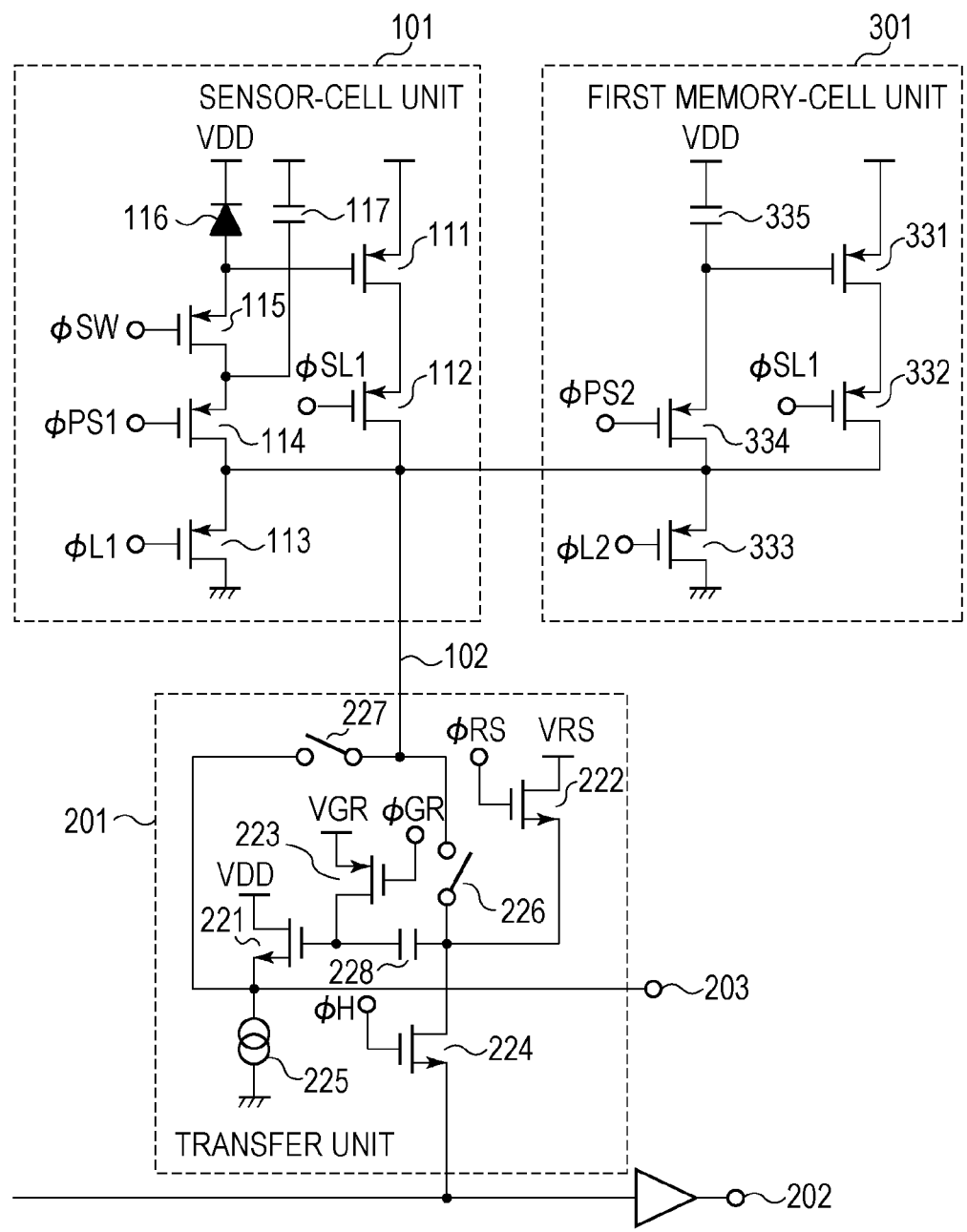
FIG. 5 is a circuit diagram illustrating an exemplary configuration of a unit pixel according to a second embodiment of the present invention.

FIG. 5 illustrates a unit pixel 11A and the transfer unit connected thereto. The unit pixel 11A includes a censor-cell unit 101 and a first memory-cell unit 301. In FIG. 5, each of the signs "ϕX" labeled by the control electrodes and the switches of MOS transistors denotes a signal transmitted from a control unit (not shown).

As for the unit pixel 11A, the sensor-cell unit 101 includes a PD 116 which is a photoelectric-conversion element, MOS transistors 111, 112, 113, 114, and 115, and a capacitance element (CP) 117. When the MOS transistor 112 which is a sensor-cell unit-selection switch is brought into conduction, the MOS transistor 111 together with the MOS transistor 113 which is a load-MOS transistor operate as an inverting amplifier with a gain of −1. The control electrode of the MOS transistor 111 functions as the input terminal of the above-described inverting amplifier and is connected to the anode of the PD 116 and one of main electrodes of the MOS transistor 115 provided as a sensitivity-change switch. Accordingly, the sensor-cell unit 101 can operate in the low-sensitivity mode and the high-sensitivity mode. That is, the PD 116 and the CP 117 are electrically connected to each other in the low-sensitivity mode, and the PD 116 and the CP 117 are electrically disconnected from each other in the high-sensitivity mode. The other main electrode of the MOS transistor 115 is connected to one of terminals of the CP 117 and one of main electrodes of the MOS transistor 14. The other main electrode of the MOS transistor 114 is connected to one of main electrodes of the load-MOS transistor 113 and one of main electrodes of the MOS transistor 112. The other main electrode of the MOS transistor 112 is connected to one of main electrodes of the MOS transistor 111. According to the above-described configuration, the MOS transistor 115 is in a non-conductive state and the sensitivity of the sensor-cell unit is determined based on the parasitic capacitance Cpd of the PD 116 in the high-sensitivity mode. On the other hand, in the low-sensitivity mode, the MOS transistor 115 is brought into conduction based on the signal ϕSW so that the PD 116 and the CP 117 are connected in parallel with a path between the power voltage VDD and GND. Therefore, the capacitance value CP of the CP 117 is added to the parasitic capacitance Cpd of the PD 116 so that the sensitivity of the sensor-cell unit is determined based on (Cpd+CP).

Further, the MOS transistors 114 and 115 function as write switches to write the reset noise of a pixel unit, the reset noise occurring when the residual electrical charge of the PD 116 is reset, based on the individual signals ϕPS1 and ϕSW.

The first memory-cell unit 301 includes a memory capacitance 335 and MOS transistors 331, 332, 333, and 334. The PD 116, the CP 117, and the MOS transistor 115 that are provided in the sensor-cell unit 101 are replaced with the memory capacitance 335, and the function of each of the MOS transistors is equivalent to that of the sensor-cell unit 101.

A transfer unit 201 includes MOS transistors 221, 222, 223, and 224, a constant-current source 225, a transfer switch 226, a feedback switch 227, and a transfer capacitance 228. Signals that are stored in memory-cell units are output from individual inverting amplifier. The MOS transistor 224 is brought into conduction based on a signal ϕH output from a shift register (not shown) while the transfer switch 226 is in a conductive state so that the output signals are transferred to the buffer amplifier 202.

A common-output line 102 is connected to one of terminals of the transfer switch 226 and one of terminals of the feedback switch 227, which is a node N4. The node N4 functions as both of an input terminal and a first output terminal of the transfer unit 201. The other terminal of the transfer switch 226 is connected to one of main electrodes of the MOS transistor 222, one of main electrodes of the MOS transistor 24, and one of terminals of the transfer capacitance 228. The other main electrode of the MOS transistor 222 is connected to the power voltage VRS. Further, the other main electrode of the MOS transistor 224 is connected to the buffer amplifier 202 via a second output terminal N5 of the transfer unit 201. The other terminal of the transfer capacitance 228 is connected to one of main electrodes of the MOS transistor 223 and the control electrode of the MOS transistor 221. The other main electrode of the MOS transistor 223 is connected to the power voltage VGR satisfying the relationship expressed as VGR=VRS+Vth, where the sign Vth denotes the threshold-value voltage of the MOS transistor 221. The MOS transistor 221 and the constant-current source 225 are included in a source-follower circuit, and the output terminal of the source-follower circuit is connected to the other terminal of the feedback switch 227. The output terminal of the source-follower circuit is also connected to a third output terminal N6 of the transfer unit 201 and is connected to a monitoring unit provided in the subsequent stage.

The monitoring unit is configured to monitor a signal output from the transfer unit 201 in real time when the AGC operation is performed. The monitoring unit includes a variable-gain amplifier unit, a maximum value-minimum value detection unit (peak-bottom (PB) detection unit) illustrated in FIG. 6, a PK comparator illustrated in FIG. 7, and so forth.

The PB-detection unit includes a maximum value-detection circuit 31 and a minimum value-detection circuit 32. Input terminals 311, 312, . . . are connected to the outputs of corresponding monitor units. Here, the configuration corresponding to the maximum value-detection circuit 31, the minimum value-detection circuit 32, and three unit pixels is extracted. A signal transmitted to the input terminal 311 is connected to the non-inverting input terminal of each of amplifiers 314 and 324. An output signal of the amplifier 314 is transmitted to the control electrode of an NMOS transistor 341. The source electrode of the NMOS transistor 341 is connected to the inverting input terminal of the amplifier 314. In the maximum value-detection circuit 31, when the switch of each of the NMOS transistors 341, 342 and so forth is brought into conduction based on a signal 317, the NMOS transistors 341, 342 and so forth and a common constant-current source load 319 form a source follower. According to the above-described configuration, data of the maximum value of a plurality of signals transmitted to the maximum value-detection circuit 31 is transferred to a maximum value-minimum value comparator (peak-bottom (PB) comparator), as a PEAK output 318.

On the other hand, even though the minimum value-detection circuit 32 has the same configuration as that of the maximum value-detection circuit 31, the minimum value-detection circuit 32 is different from the maximum value-detection circuit 31 in that the source follower includes p-channel metal-oxide semiconductor (PMOS) transistors 351, 352, and so forth, and a constant-current source load 329. According to the above-described configuration, data of the minimum value of a plurality of signals that are transmitted to the minimum value-detection circuit 32 is transferred to the PB comparator, as a BOTTOM output 328.

Figure 6:
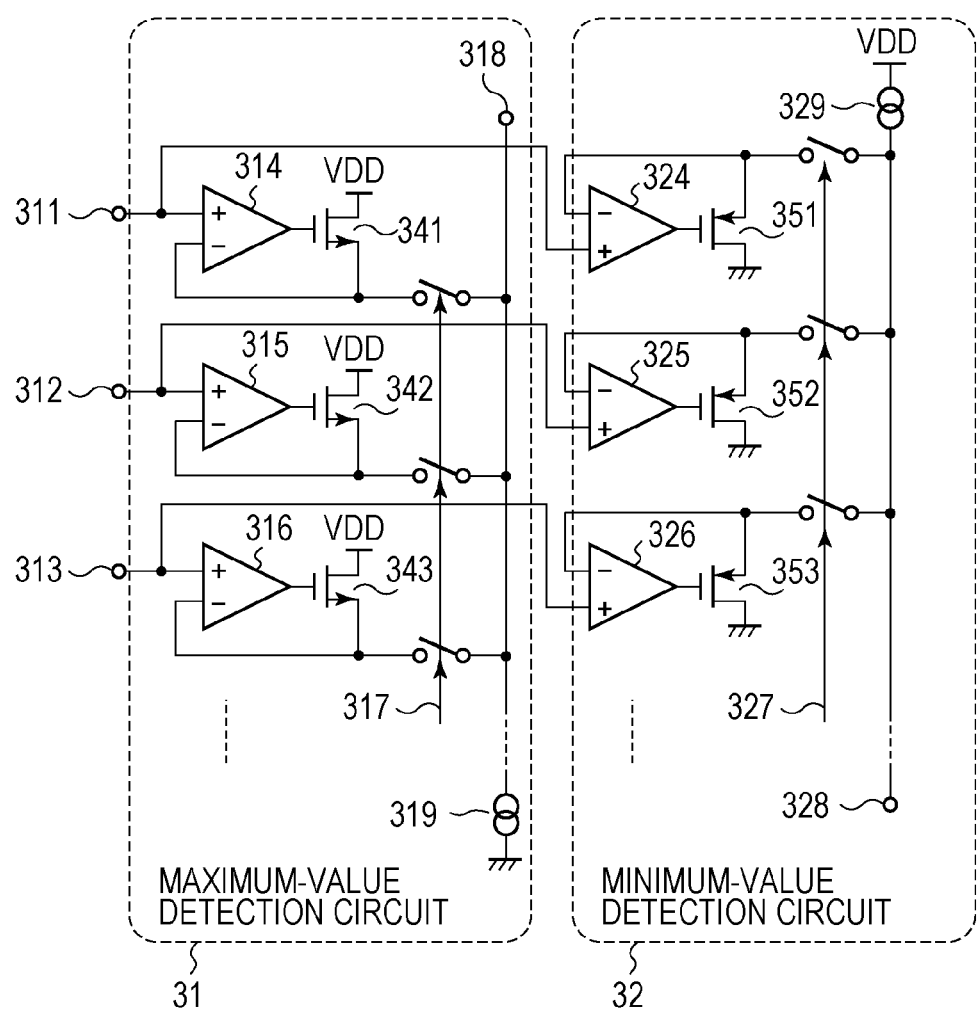
FIG. 6 is a circuit diagram illustrating an exemplary configuration of a maximum value-minimum value detection unit according to the second embodiment.
Figure 7:
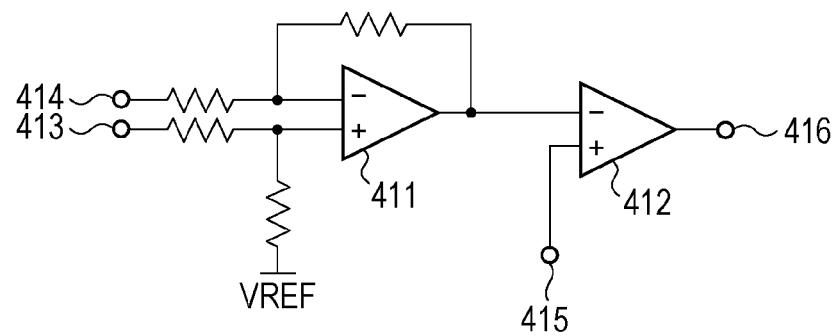
FIG. 7 is a circuit diagram illustrating an exemplary configuration of a PB comparator according to the second embodiment.

FIG. 7 is a diagram illustrating an exemplary configuration of the PB comparator configured to obtain the signal corresponding to the difference between the PEAK output 318 and the BOTTOM output 328 of the PB-detection unit illustrated in FIG. 6. In FIG. 7, an input terminal 413 is connected to the PEAK output 318 and an input terminal 414 is connected to the BOTTOM output 328. Both of the input signals are transmitted to a differential amplifier 411 and the signal corresponding to the difference between the input signals is output from the output terminal of the differential amplifier 411 to the inverting input terminal of a comparator 412. A low voltage VDAC 415 determined through a digital-to-analog (DA) converter (not shown) is applied to the non-inverting input terminal of the comparator 412. When the comparison result, that is, the contrast of the image is equivalent to or larger than a threshold value, a control unit (not shown) ends the accumulation operation of the sensor-cell unit 101. The value of the low voltage VDAC 415 is changed to 1.6V, 0.8V, 0.4V, 0.2V to correspond to the gain value ×5, ×10, ×20, ×40 of the variable-gain amplifier unit of the monitoring unit, for example.

The value of a contrast attained during the AF may not always be higher than the above-described threshold value. That is, there may be a case where the accumulation operation of the sensor-cell unit 100 needs to be ended even when the subject is of low-contrast. If the subject is of high-brightness and low-contrast, it is determined whether or not the accumulation operation should be ended at the time when a signal output from the maximum value-detection circuit 31 reaches a first level determined to be a cutoff voltage. On the other hand, if the subject is low-brightness and low-contrast, the accumulation operation is finished by force after a lapse of predetermined time.

Figure 8:
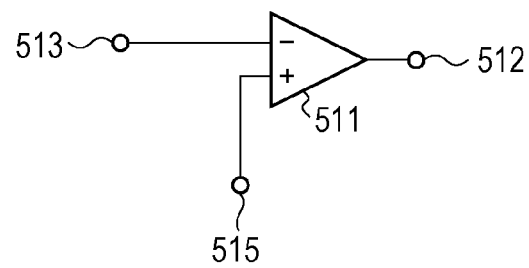
FIG. 8 is a circuit diagram illustrating an exemplary configuration of a PK comparator according to the second embodiment.

FIG. 8 is a diagram illustrating an exemplary configuration of a maximum-value comparator (peak (PK) comparator) provided to determine whether or not a signal output from the maximum-value detection circuit 31 reaches the cutoff voltage. The PEAK output 318 of the maximum-value detection circuit 31 is connected to an inverting-input terminal 513 of the PK comparator and a cutoff voltage VBB is transmitted to a non-inverting input terminal of the PK comparator. The cutoff voltage VBB is set to a level lower than the saturation level of the sensor-cell unit 100 operating in the high-sensitivity mode which will be described later. A control unit (not shown) monitors an output 512 of the PK comparator and finishes the accumulation operation of the sensor-cell unit 101 in accordance with inversion of the output 512 of the PK comparator.

Figure 9:
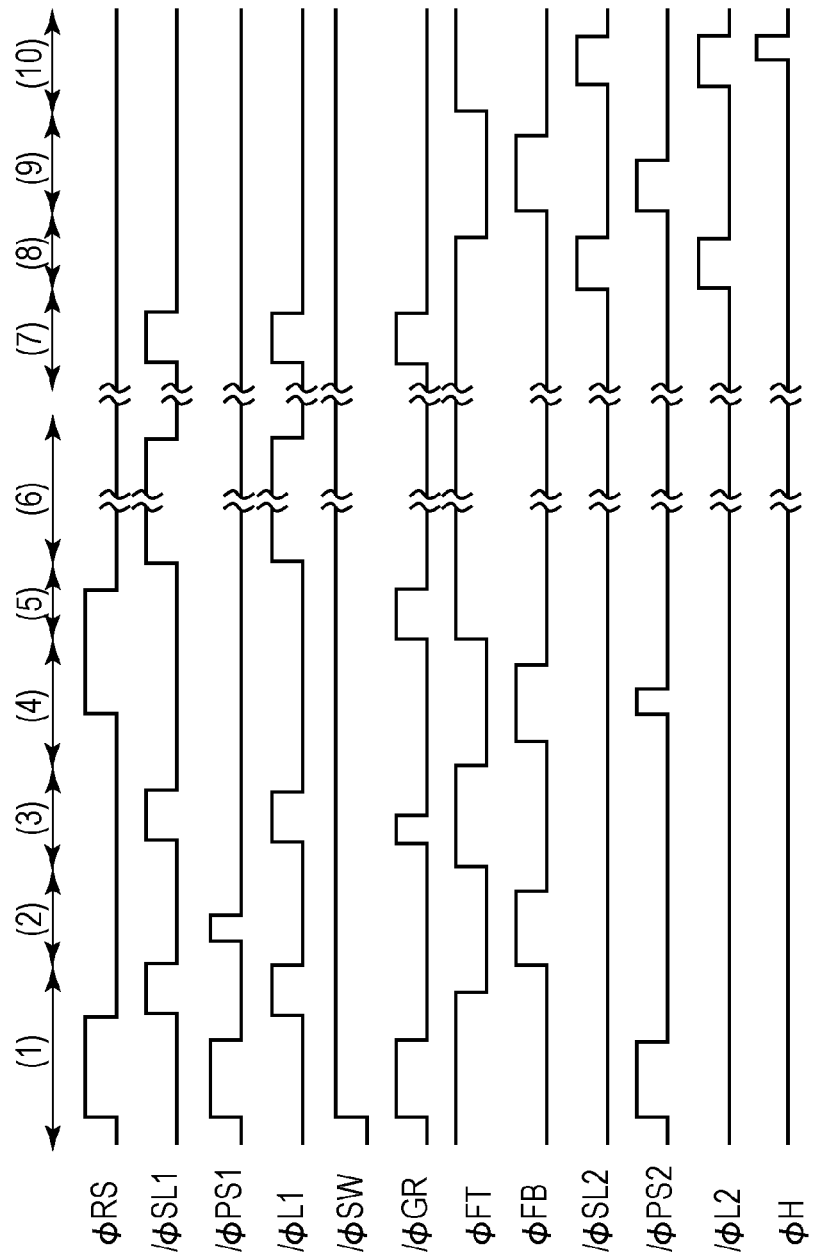
FIG. 9 is a circuit diagram illustrating a photoelectric-conversion device according to the second embodiment, where the photoelectric-conversion device is exemplarily driven in the low-sensitivity mode.

Next, operations of the photoelectric-conversion device illustrated in FIG. 3 will be described with reference to a timing chart of FIG. 9. In FIG. 9, the sign "/" indicating the inverted state is used for a signal provided to a PMOS transistor. For example, even though a signal ϕSL1 is applied to the control electrode of the PMOS transistor 112, the signal ϕSL1 is shown as its inverted signal /ϕSL1 in FIG. 9. That is, FIG. 9 illustrates that the PMOS transistor 112 is brought into conduction when the signal /ϕSL1 is on a high level. Accordingly, when each of signals that are illustrated in FIG. 9 is in a high level, a corresponding switch or MOS transistor to which the signal is applied is brought into conduction.

Hereinafter, operations that are performed in the low-sensitivity mode will be described. In a period (1), the signal ϕSW is raised to a high level, and the sensitivity of the sensor-cell unit 101 is determined based on (Cpd+Cp). Further, in the period (1), each of signals ϕRS, ϕFT, /ϕPS1, and /ϕPS2 is raised to a high level, and the sensor-cell unit 101 and the first memory-cell unit are reset based on the power voltage VRS. Further, since the signal /ϕGR is raised to a high level, the transfer capacitance 228 is reset based on the power voltages VRS and VGR. At that time, an output signal of the source follower including the MOS transistor 221 and the constant-current source 225 is expressed by the equation VGR−Vth=VRS.

Next, after each of the signals ϕRS, /ϕGR, /ϕPS1, and /ϕPS2 is lowered to a low level, each of the signal /ϕSL1 and a signal ϕL1 is raised to a high level when the signal ϕFT is in a high level. Accordingly, the data of a sensor noise Ns1 obtained after the reset of the sensor-cell unit is written into the transfer capacitance 228 via the inverting amplifier and the common-output line 102. After that, the signal ϕFT is lowered to a low level so that the data writing is finished, and the signals /ϕSL1 and /ϕL1 are lowered to a low level.

In a period (2), the gate potential of the MOS transistor 221 is expressed as VGR+Ns1. When the signal ϕFB is raised to a high level, a noise Ns1+Nt obtained by adding the noise of the transfer unit 201 relative to the power voltage VRS is transmitted to the sensor-cell unit 101.

In a period (3), the signal ϕFT is in a high level. When the signals /ϕSL1 and /ϕL1 are raised to a high level during the period (3), the inverting amplifier of the sensor-cell unit 101 operates so that the noise Ns1 is added to −(Ns1+Nt) and a noise −(Nt) is output. Since the signal /ϕGR is temporarily raised to a high level in the period (3), the other terminal of the transfer capacitance 228 enters an electrically-floating state when the period (3) is finished, and the potential difference VGR+Nt is stored in the transfer capacitance 228.

When the signals ϕRS and /ϕPS2 are raised to a high level in the period where the signal ϕFT is in a high level in a period (4), one of the terminals of the transfer capacitance 228 attains the potential of the power voltage VRS and varies by as much as the noise Nt. Therefore, the other terminal of the transfer capacitance 228 also varies by as much as the noise Nt. At that time, the value of a noise which is output from the source follower including the MOS transistor 221 and the constant-current source 225 is 2Nt, and this noise 2Nt is stored in the memory capacitance 335.

In the period where each of the signals ϕFT and ϕRS is in a high level in a period (5), each of the signals /ϕPS1 and /ϕGR is raised to a high level so that the sensor-cell unit 101 is reset.

The AGC operation is performed in a period (6). When each of the signals /ϕSL and /ϕL1 is raised to a high level, an output signal obtained through the inverting amplifier of the sensor-cell unit 101 becomes as below. That is, the noise Ns1 of the sensor-cell unit is added to −(S1+Ns1+Nt) where the sign S1 denotes an optical signal obtained through the photoelectric conversion, so −(S1+Nt) is transmitted to one of terminals of the transfer capacitance 228, as a result. Since the other terminal of the transfer capacitance 228 becomes a potential expressed as VGR−(N1+Nt), the noise Nt of the transfer unit 201 is added to −(S1+Nt), so the optical signal −S1 is output from an output terminal 203. A change in the output of the sensor-cell unit 101, which occurs in the period (6), is observed through a monitoring unit MON in real time via the output terminal 203. The monitoring unit MON includes a gain-variable amplifier unit so that the gain is made variable based on the result of contrast detection which will be described later. The above-described arrangement is referred to as the automatic gain control (AGC). As the result of a monitoring operation performed through the monitoring unit MON, an optical signal output from the sensor-cell unit 101 at the time when the accumulation operation is finished in the period (6) is determined to be −S2.

In a period (7), the signal φFT is maintained at a high level, and the signals /φSL1, /φL1, and /φGR are raised to a high level so that the potential of one of electrodes of the transfer capacitance 228 changes from the power voltage VRS by as much as −(S2+Nt).

When each of the signals /φSL2 and /φL2 is raised to a high level in a period (8), a noise Nm2 of a second memory-cell unit 401 is added to a noise 2Nt stored in the first memory-cell unit 301 so that −2Nt+Nm2 is transmitted to one of terminals of the transfer capacitance 228. That is, the potential-variation amount corresponding to −2Nt+Nm2−(−(S2+Nt))=S2−Nt+Nm2 is stored in the transfer capacitance 228.

In a period (9), the signal φFT is in a low level. When the signal /φPS2 is raised to a high level in the period where the signal φFB is on a high level, the noise Nt is added to S2−Nt+Nm2 so that S2+Nm2 is transmitted from the transfer unit 201 to the first memory-cell unit 301.

When the signal φFT is raised to a high level, and each of the signals /φSL2 and /φL2 is further raised to a high level in a period (10), the noise Nm2 is added to −(S2+Nm2) inverted through the inverting amplifier so that a signal −S2 is transmitted to the transfer unit 201. When a signal φH is transmitted from a shift register (not shown) in that state, the signal is read via the buffer amplifier 202. The signal read from the buffer amplifier 202 is used to determine at what position (bit) a pixel unit acquiring a signal of the maximum value or the minimum value is provided in the pairs of line-sensor portions that are illustrated in FIG. 1. The defocus amount of a subject (a deviation from the focus point) is detected based on information about the above-described position. The control unit (not shown) adjusts and brings the optical system of an image-pickup apparatus into focus based on the detected defocus amount. Thus, the AGC operation can be performed based on the signal −S1 obtained by reducing the noise of the sensor-cell unit during the operations that are performed in the low-sensitivity mode. Further, as the signal −S2 which is read after the accumulation operation is finished also includes the reduced noise of the sensor-cell unit, a signal with a high S/N ratio can be obtained.

Figure 10:
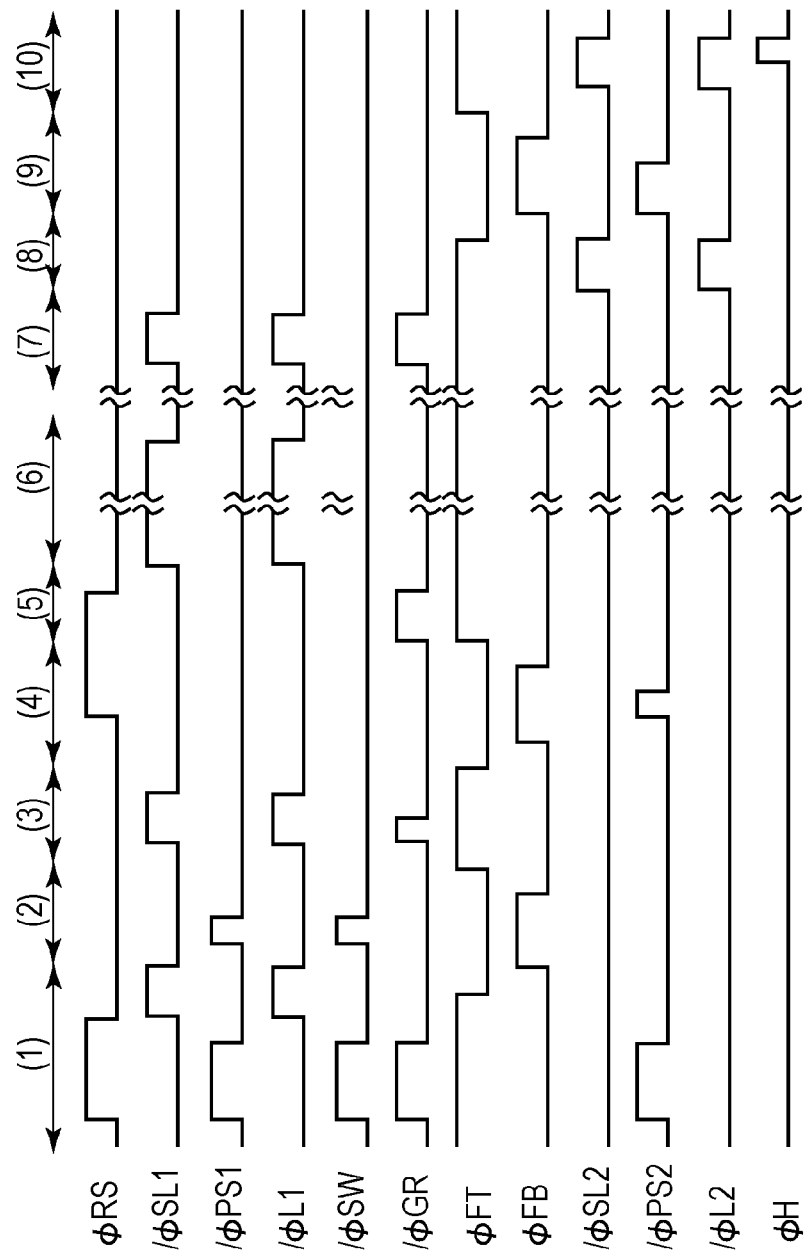
FIG. 10 is a circuit diagram illustrating the photoelectric-conversion device according to the second embodiment, where the photoelectric-conversion device is exemplarily driven in the high-sensitivity mode.

Hitherto, the cases where the photoelectric-conversion device operates in the low-sensitivity mode have been described with reference to the timing chart of FIG. 9. Hereinafter, the cases where the photoelectric-conversion device operates in the high-sensitivity mode will be described with reference to FIG. 10.

The operations that are performed in the high-sensitivity mode are different from those performed in the low-sensitivity mode in that the signal /φSW is maintained at a low level in the high-sensitivity mode except in part of each of the periods (1) and (2). Accordingly, the signal detection can be performed even though the sensor-cell unit has a small detection capacitance so that the signal detection can be performed under low-brightness conditions. Since the signal detection can be performed in the high-sensitivity mode while reducing a noise occurring in the sensor-cell unit, the S/N ratio can be increased. Since the high-sensitivity mode is usually used under the low-brightness condition, that is, the small-signal component condition, increasing the S/N ratio is effective.

Thus, in the present embodiment, the photoelectric-conversion device can operate by switching the sensor-cell unit between the high-sensitivity mode and the low-sensitivity mode. Therefore, both widening of the dynamic range and performing an operation to monitor the amount of received light can be realized. Further, the present embodiment allows for detecting a signal with a high S/N ratio so that high precision can be achieved.

Third Embodiment

Figure 11:
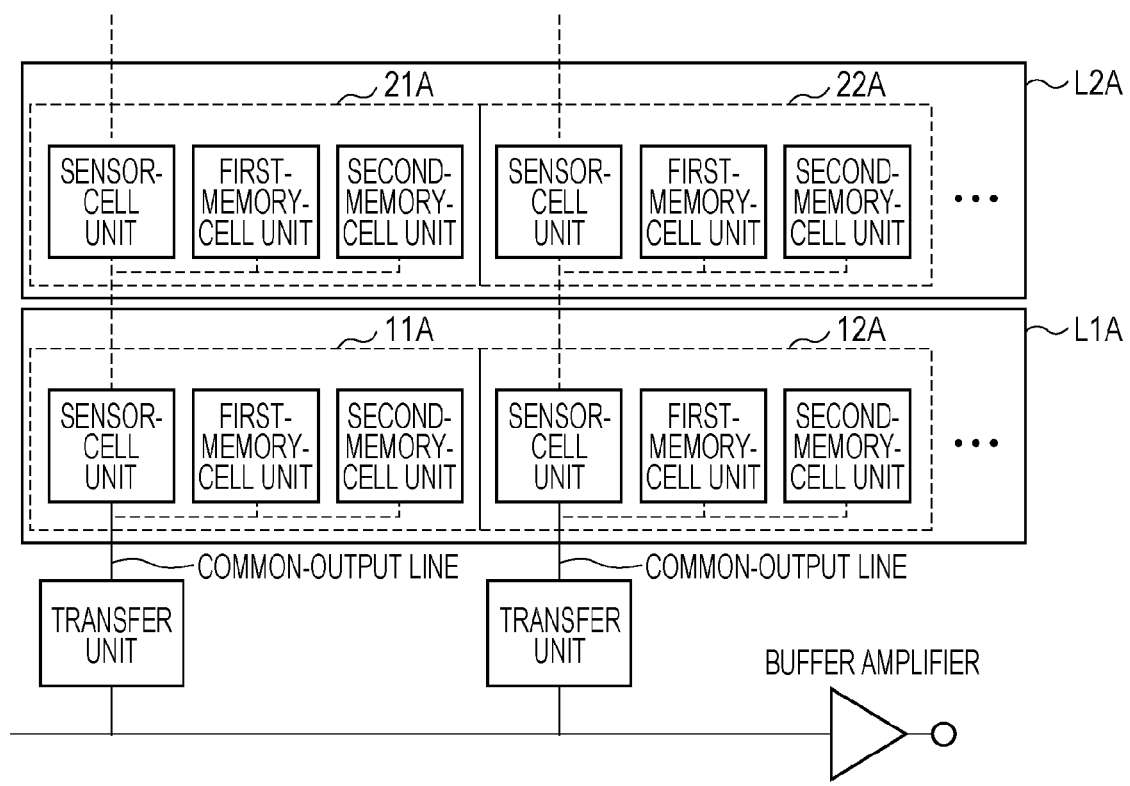
FIG. 11 is a block diagram illustrating a line-sensor portion according to a third embodiment of the present invention.

FIG. 11 is a block diagram illustrating a part relating to the line-sensor portions L1A, L2A, and so forth in more detail. Each of unit pixels includes a sensor-cell unit, a first memory-cell unit, and a second memory-cell unit, and is connected to a common-output line. Further, unit pixels that are provided at positions that are equivalent to one another, the positions that are defined in individual different line-sensor portions, are connected to a common transfer unit via a common-output line. Each of the transfer units is connected to a common buffer amplifier. The configuration of each of the line-sensor portions L1B, L2B, and so forth is the same as that illustrated in FIG. 2.

Figure 12:
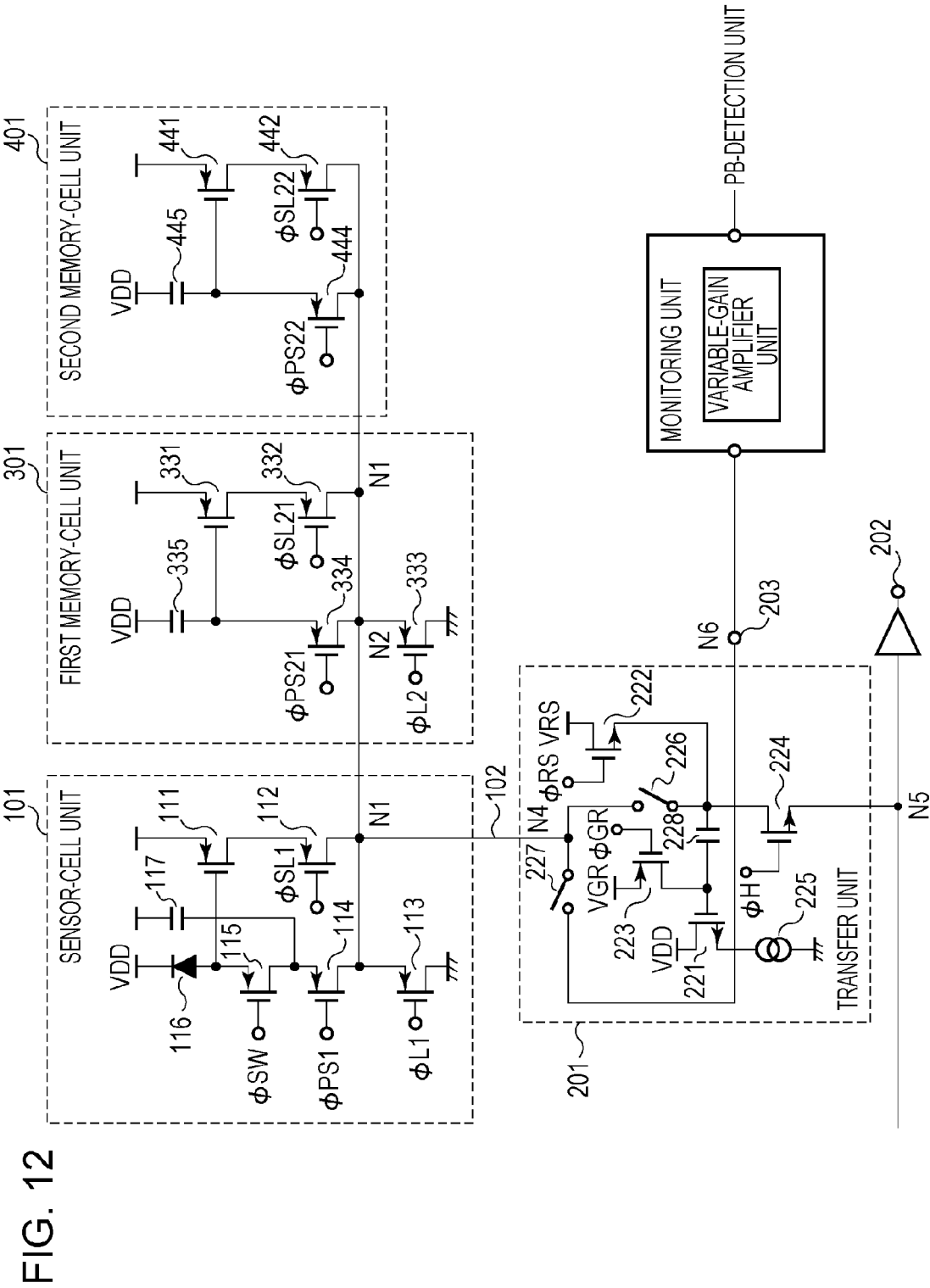
FIG. 12 is a circuit diagram illustrating an exemplary configuration of a unit pixel according to the third embodiment.

FIG. 12 illustrates the line-sensor portion LS1 extracted from the configuration illustrated in FIG. 11, and particularly illustrates the unit pixel 11A and a transfer unit connected thereto. The unit pixel 11A includes the sensor-cell unit 101, the first memory-cell unit 301, and the second memory-cell unit 401. In FIG. 12, the sign "φX" used for each of the control electrodes and the switches of MOS transistors denotes a signal transmitted from a control unit (not shown). The configuration of a photoelectric-conversion device according to a third embodiment of the present invention is the same as that of the second embodiment except that the second memory-cell unit 401 is further provided in each of the unit pixels. Since the second and third embodiments are identical except for the second memory-cell unit 401, further description of the third embodiment will be omitted.

The second memory-cell unit 401 is different from the first memory-cell unit 301 in that the load-MOS transistor 333 is eliminated. This is because the load-MOS transistor 333 is shared between the first memory-cell unit 301 and the second memory-cell unit 401. A separate load-MOS transistor may be provided in each of the first memory-cell unit 301 and the second memory-cell unit 401. In the present embodiment, the load-MOS transistor provided in the sensor-cell unit 101 is different from that provided in the memory-cell unit. However, the load-MOS transistor may be shared between the sensor-cell unit 101 and the memory-cell unit.

Figure 13:
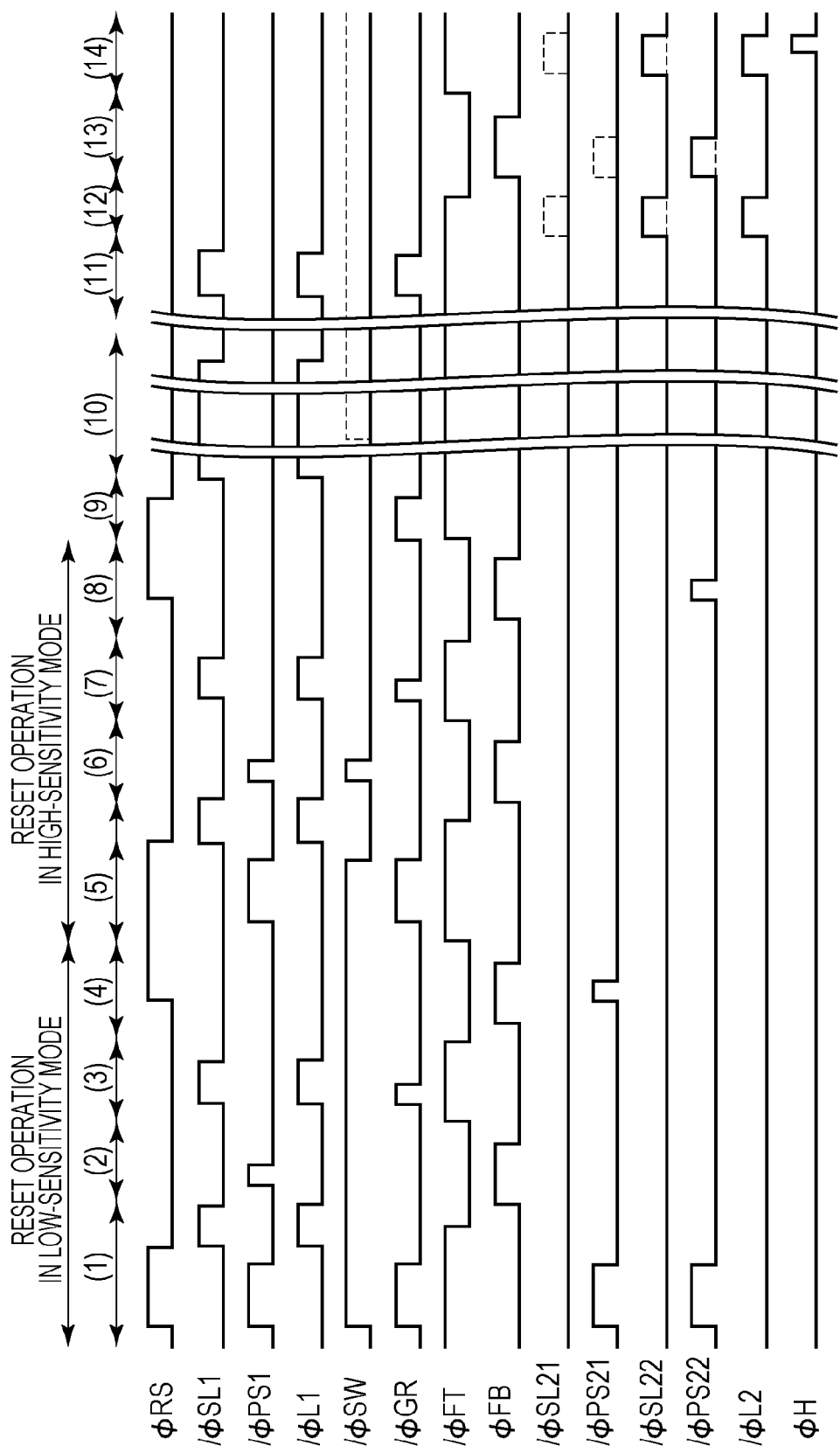
FIG. 13 is a timing chart illustrating a photoelectric-conversion device according to the third embodiment, the photoelectric-conversion device being exemplarily driven.

Next, operations of the photoelectric-conversion device illustrated in FIG. 12 will be described with reference to a timing chart of FIG. 13. In FIG. 13, the sign "/" indicating the inverted state is used for a signal applied to a PMOS transistor. For example, even though the signal φSL1 is applied to the control electrode of the PMOS transistor 112, the signal φSL1 is described as an inverted signal /φSL1 obtained by inverting the signal φSL1 in FIG. 13. That is, FIG. 13 illustrates that the PMOS transistor 112 is brought into conduction when the signal /φSL1 is in a high level. Accordingly, when each of signals that are illustrated in FIG. 13 is in a high level, a switch and/or a MOS transistor to which the signal is applied is brought into conduction.

Hereinafter, the operations will be described based on a signal indicated by a solid line. First, the operations are performed in the low-sensitivity mode. In a period (1), the signal φSW is raised to a high level, and the sensitivity of the sensor-cell unit 101 is determined based on (Cpd+Cp). Further, in the period (1), each of the signals φRS, φFT, /φPS1, /φPS21, and /φPS22 is raised to a high level, and the sensor-cell unit 101, and the first and second memory-cell units are reset based on the power voltage VRS. Further, since the signal /φGR is raised to a high level, the transfer capacitance 228 is reset based on the power voltages VRS and VGR. At that time, an output signal of the source follower including the MOS transistor 221 and the constant-current source 225 is expressed by the equation VGR−Vth=VRS.

Next, after each of the signals φRS, /φGR, /φPS1, /φPS21 and /φPS22 is lowered to a low level, each of the signals /φSL1 and φL1 is raised to a high level in the state where the signal φFT is on a high level. Accordingly, data of the sensor noise Ns1 obtained after the reset of the sensor-cell unit is written into the transfer capacitance 228 via the inverting amplifier and the common-output line 102. After that, the signal φFT is lowered to a low level so that the data writing ends, and the signals /φSL1 and /φL1 are lowered to a low level.

In a period (2), the gate potential of the MOS transistor 221 is VGR+Ns1. When the signal φFB is raised to a high level, the noise Ns1+Nt obtained by adding the noise of the transfer unit 201 relative to the power voltage VRS is transmitted to the sensor-cell unit 101.

In a period (3), the signal φFT is on a high level. When the signals /φSL1 and /φL1 are raised to a high level during the period (3), the inverting amplifier of the sensor-cell unit 101 operates so that the noise Ns1 is added to −(Ns1+Nt) and the noise −(Nt) is output. Since the signal /φGR is temporarily raised to a high level in the period (3), the other terminal of the transfer capacitance 228 enters the electrically-floating state when the period (3) is finished, and the potential difference VGR+Nt is stored in the transfer capacitance 228.

When the signal φRS and a signal /φPS21 are raised to a high level in the period where the signal φFT is on a high level in a period (4), one of the terminals of the transfer capacitance 228 attains the potential of the power voltage VRS and varies by as much as the noise Nt. Therefore, the other terminal of the transfer capacitance 228 also varies by as much as the noise Nt. At that time, the value of a noise which is output from the source follower including the MOS transistor 221 and the constant-current source 225 is 2Nt, and data of the noise 2Nt is stored in the memory capacitance 335.

In the period where each of the signals φFT and φRS is on a high level in a period (5), each of the signals /φPS1 and /φGR is raised to a high level so that the sensor-cell unit 101 is reset.

After that, the signal /φSW is lowered to a low level so that the sensor-cell unit 101 is shifted to the high-sensitivity mode, and each of the signals /φGR, /φPS1, and φRS is lowered to a low level. The value of a noise occurring in the sensor-cell unit 101 at that time is determined to be Ns2. The noise Ns2 occurs when the CP 117 is not electrically connected to the PD 116. After that, the signals /φSL1 and /φL1 are raised to a high level during the time period where the signal φFT is in a high level and data of the sensor noise Ns2 is written into the transfer capacitance 228.

In a period (6), the value of a potential given to the control electrode of the MOS transistor 221 is VGR+Ns2. Therefore, the value of a potential given to the common-output line 102 via the feedback switch 227 becomes VRS+Ns2. After that, the signals /φPS1 and /φSW are temporarily raised to a high level in the time period where the signal φFB is on a high level, and a noise Ns2+Nt obtained by adding a noise Nt occurring in the transfer unit 201 to the sensor noise Ns2 is transmitted to the sensor-cell unit 101.

In a period (7), the signal φFT is on a high level and one of the terminals of the transfer capacitance 228 is electrically connected to the common-output line 102 via the transfer switch 226. The signals /φSL1 and /φL1 are raised to a high level in that time period so that the sensor noise Ns2 is added to an inverted amplifier output −(Ns2+Nt) of the sensor-cell unit 101 and a noise −Nt is transmitted to one of the terminals of the transfer capacitance 228. The signal /φGR is temporarily raised to a high level to clamp the level attained at that time. Consequently, the potential difference VGR+Nt is stored in the transfer capacitance 228.

In a period (8), first, the signal φFB is raised to a high level, and an output of the source follower including the MOS transistor 221 and the constant-current source 225 is connected to the common-output line 102. Then, the signals φRS and /φPS22 are raised to a high level so that the noise 2Nt is written into the memory capacitance 445.

In a period (9), each of the signals φRS, /φGR, and φFT is raised to a high level so that the transfer capacitance 228 is reset and the common-output line 102 is also reset. At that time, an output of the source follower including the MOS transistor 221 and the constant-current source 225 is VRS.

The AGC operation is performed in a period (10). When each of the signals /φSL and /φL1 is raised to a high level, an output signal obtained through the inverting amplifier of the sensor-cell unit 101 becomes as below. That is, the noise Ns2 of the sensor-cell unit is added to −(S1+Ns2+Nt) where the sign S1 denotes an optical signal obtained through the photoelectric conversion, so that −(S1+Nt) is transmitted to one of the terminals of the transfer capacitance 228, as a result. Since the other terminal of the transfer capacitance 228 attains a potential expressed as VGR−(N1+Nt), the noise Nt of the transfer unit 201 is added to −(S1+Nt) so that the optical signal −S1 is output from the output terminal 203. A change in the output of the sensor-cell unit 101, which occurs in the period (10), is observed through the monitoring unit MON in real time via the output terminal 203. The monitoring unit MON includes the gain-variable amplifier unit so that the gain is made variable based on the result of contrast detection which will be described later. The above-described arrangement is referred to as the automatic gain control (AGC). As a result of a monitoring operation performed through the monitoring unit MON, an optical signal output from the sensor-cell unit 101 at the time when the accumulation operation is finished in the period (10) is determined to be −S2.

In a period (11), the signal φFT is maintained at a high level, and each of the signals /φSL1, /φL1, and /φGR is raised to a high level so that the potential of one of the electrodes of the transfer capacitance 228 changes from the power voltage VRS by as much as −(S2+Nt).

When each of the signals /φSL21 and /φL2 is raised to a high level in a period (12), the noise Nm2 of the second memory-cell unit 401 is added to the noise 2Nt stored in the second memory-cell unit 401 so that −2Nt+Nm2 is transmitted to one of the terminals of the transfer capacitance 228. That is, the potential-variation amount corresponding to −2Nt+Nm2−(−(S2+Nt))=S2−Nt+Nm2 is stored in the transfer capacitance 228.

In a period (13), the signal φFT is in a low level. When the signal /φPS22 is raised to a high level in the time period where the signal φFB is in a high level, the noise Nt is added to S2−Nt+Nm2 so that S2+Nm2 is transmitted from the transfer unit 201 to the second memory-cell unit 401.

When the signal φFT is raised to a high level, and each of the signals /φSL22 and /φL2 is also raised to a high level in a period (14), the noise Nm2 is added to −(S2+Nm2) inverted through the inverting amplifier so that the signal −S2 is transmitted to the transfer unit 201. When the signal φH is transmitted from a shift register (not shown) in that state, a signal is read via the buffer amplifier 202. The signal read from the buffer amplifier 202 is used to determine at what position (bit) a pixel unit acquiring a signal of the maximum value and/or the minimum value is provided in the pairs of line-sensor portions that are illustrated in FIG. 1. The defocus amount of a subject (a deviation from the focus point) is detected based on information about the above-described position. The control unit (not shown) adjusts and brings the optical system of an image-pickup apparatus into focus based on the detected defocus amount.

Hitherto, the cases where the photoelectric-conversion device operates in the high-sensitivity mode after the period (10) have been described with reference to a signal indicated by a broken line in the timing chart of FIG. 13. Hereinafter, the cases where the photoelectric-conversion device starts operating in the low-sensitivity mode during the period (10) will be described with reference to the signal indicated by the broken line. The photoelectric-conversion device is shifted to the low-sensitivity mode during the period (10) when an output of the PK comparator is inverted, that is, when the PEAK output 318 reaches the cutoff voltage VBB in the first half of the period (10) where the real time AGC is performed. In that case, the signal /ϕSW is raised to a high level in response to the inversion of the output of the PK comparator, and the CP 117 is added to the PD 116.

In the period (11) and later, the low-sensitivity mode is different from the above-described high-sensitivity mode only in that the memory for use is changed to the first memory-cell unit 301. Therefore, the detailed description of the operations will be omitted.

The operation performed to shift to the low-sensitivity mode during the period (10) is characteristic in that a signal −S3 which is output from the buffer amplifier 202 in a period (14) includes a noise occurring due to the MOS transistor 115 being brought into conduction during the accumulation operation. However, the above-described noise can be ignored under high-brightness conditions that can cause the output of the PK comparator to be inverted.

Figure 14:
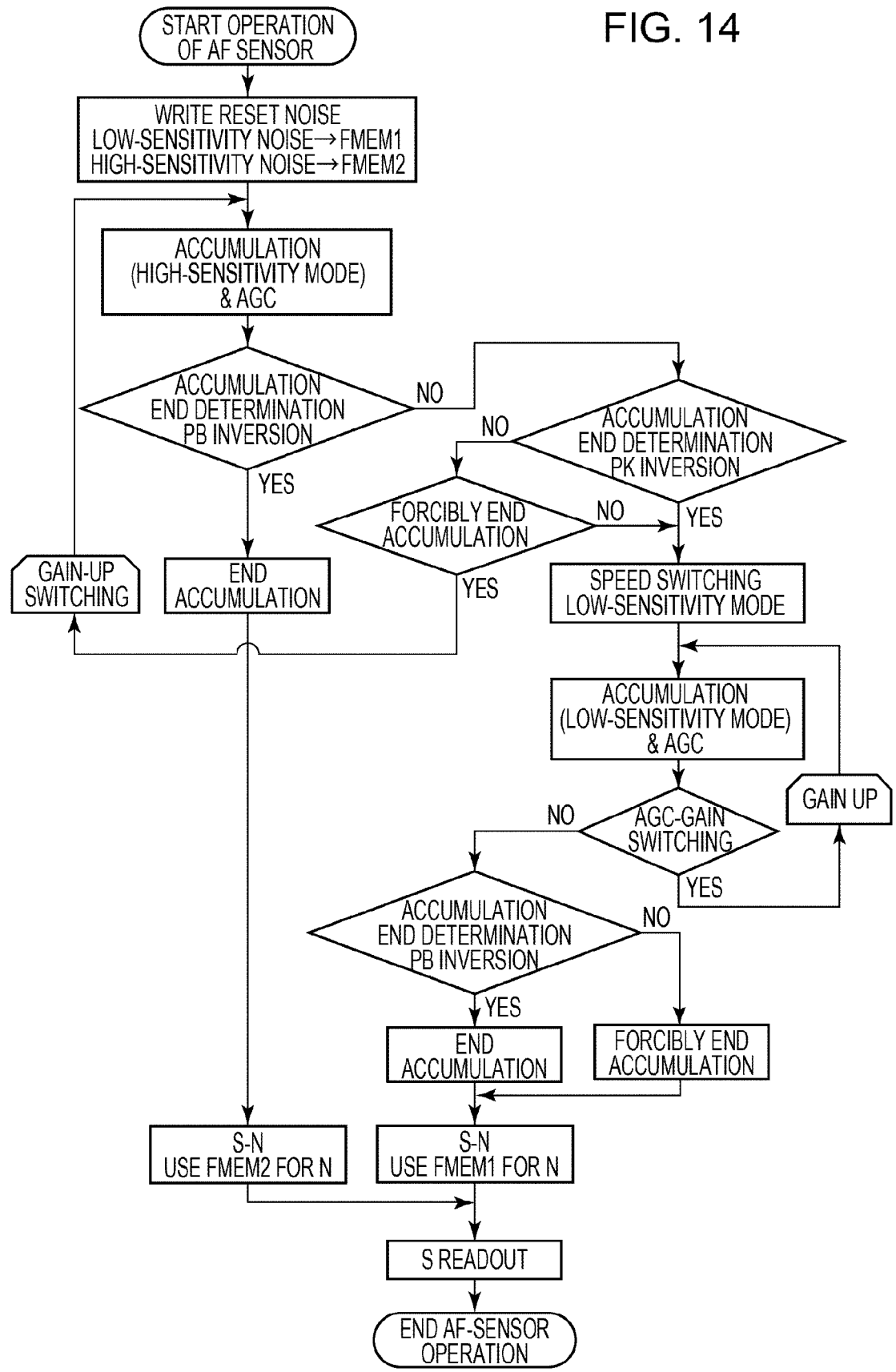
FIG. 14 is a flowchart illustrating exemplary operations that are performed according to the third embodiment.

Next, a flowchart illustrating the operations of an AF sensor will be illustrated with reference to FIG. 14.

First, when the operations of the AF sensor are started, a noise occurring due to the reset of the sensor-cell unit 101 is written into the memory-cell unit. Here, a noise occurring in the low-sensitivity mode where the CP is connected to the PD is written into the first memory-cell unit and a noise occurring in the high-sensitivity mode where the CP is disconnected from the PD is written into the second memory-cell unit (the periods (1) to (8)).

Subsequent to writing the noise occurring in the high-sensitivity mode into the second memory-cell unit, the accumulation operation is performed in the high-sensitivity mode. At the same time, the AGC operation is performed to control the gain of the variable-gain amplifier unit while monitoring a signal through the monitoring unit (the periods (9) to (10)).

Next, when the value of contrast becomes equal to or higher than a threshold value by the PB comparator, that is, when an output of the PB comparator is inverted in the period where a predetermined time elapses after the AGC operation is started in the period (10), the accumulation operation of the sensor-cell unit is finished. After the accumulation operation is finished, a noise-reduction operation is performed through the second memory-cell unit (the periods (11) to (13)), and a signal is read from the buffer amplifier 202 (the period (14)).

On the other hand, when the output of the PB comparator is not inverted in the period where the predetermined time elapses after the AGC operation is started in the period (10), it is determined whether or not the output of the PK comparator is inverted. The above-described predetermined time may be set according to the use. When the output of the PB comparator is not inverted, the brightness and the contrast are low. Therefore, the accumulation operation is forcibly ended, the gain of the variable-gain amplifier unit is set to a high value, and the accumulation operation is started again in the high-sensitivity mode. On the other hand, when a PK-inverse signal is inverted, the brightness is high and the contrast is low. Therefore, the CP is electrically connected to the PD in the sensor-cell unit and the sensor-cell unit is shifted to the low-sensitivity mode. As described above, the cutoff voltage VBB provided to the PK comparator is set to a voltage lower than the saturation level attained in the high-sensitivity mode, so that the cutoff voltage VBB becomes lower than the saturation level after the shift to the low-sensitivity mode. Consequently, the accumulation operation may not be performed again from the start so that the operations can be performed with high speed. The shift to the low-sensitivity mode allows for obtaining a contrast sufficient to ensure a long accumulation period under the high-brightness conditions.

Next, when the output of the PB comparator is inverted, the accumulation operation ends. Otherwise, the gain of the variable-gain amplifier unit is set to a higher value and the accumulation operation is performed again from the start in the low-sensitivity mode.

When the output of the PB comparator is inverted during the AGC operation performed in the low-sensitivity mode, the accumulation operation of the sensor-cell unit is ended and the noise-reduction operation is performed through the first memory-cell unit (the periods (11) to (13)), and a signal is read from the buffer amplifier 202 (the period (14)).

Thus, in the present embodiment, the accumulation operation of the sensor-cell unit is started in the high-sensitivity mode during the AGC period where the optical signal of the sensor-cell unit is monitored. Therefore, in the case where the focus of a high-brightness and low-contrast subject is detected, it becomes possible to shift to the low-sensitivity mode and detect a contrast without reinitializing the accumulation operation of the sensor-cell unit, so that the AF operation can be performed with high speed.

Fourth Embodiment

The third embodiment illustrates the operations of the photoelectric-conversion device with reference to the timing chart illustrated in FIG. 13. In FIG. 13, the noise-cancellation operation is performed in each of the low-sensitivity mode and the high-sensitivity mode, and a noise 2×Nt occurring in the transfer unit is written into each of the first and second memory-cell units. Though the detailed description is not provided in the first embodiment, a random noise occurs when the corresponding switch or the MOS transistor is driven. Therefore, the difference between the noise written into the first memory-cell unit 301 in the period (4) and that written into the second memory-cell unit 401 in the period (8) lies in a component originating from a random noise occurring in the switch or the like. According to the operations that are illustrated in FIG. 13, the random noise is removed from the signal read in the period (14), so that the AF operation can be performed with high precision.

The present embodiment illustrates operations that are performed without consideration of the above-described random noise. In that case, each of the signals /ϕPS21 and /ϕPS22 is raised to a high level in the period (4) illustrated in FIG. 13. After that, the operation corresponding to the period (9) can be performed while omitting the operations corresponding to the periods (5) to (8) that are illustrated in FIG. 13, so that the AF operation can be performed with high speed. As the present invention allows for starting the AGC operation in the high-sensitivity mode, the same effect as that of the first embodiment can also be obtained.

Further, the operations corresponding to the periods (1) to (4) may be performed in the high-sensitivity mode so that a noise occurring in the high-sensitivity mode is written into the memory-cell unit. In that case, the MOS transistor 115 may not be operated during the time from when the noise is written into the memory-cell unit to when the AGC operation is started. Therefore, a random noise caused by the MOS transistor 115 can be reduced. Since the high-sensitivity mode is effective under the low-sensitivity conditions, that is, when there are not many signal components, the noise reduction allows for performing the AF operation with high precision.

Further, since a single memory-cell unit is provided in each of the unit pixels according to the present embodiment, the photoelectric-conversion device can be reduced in size.

Further, switching may be performed to execute the operation relating to the first embodiment at a request for precision and/or the operation relating to the present embodiment at a request for a high-speed operation.

Fifth Embodiment

Figure 15:
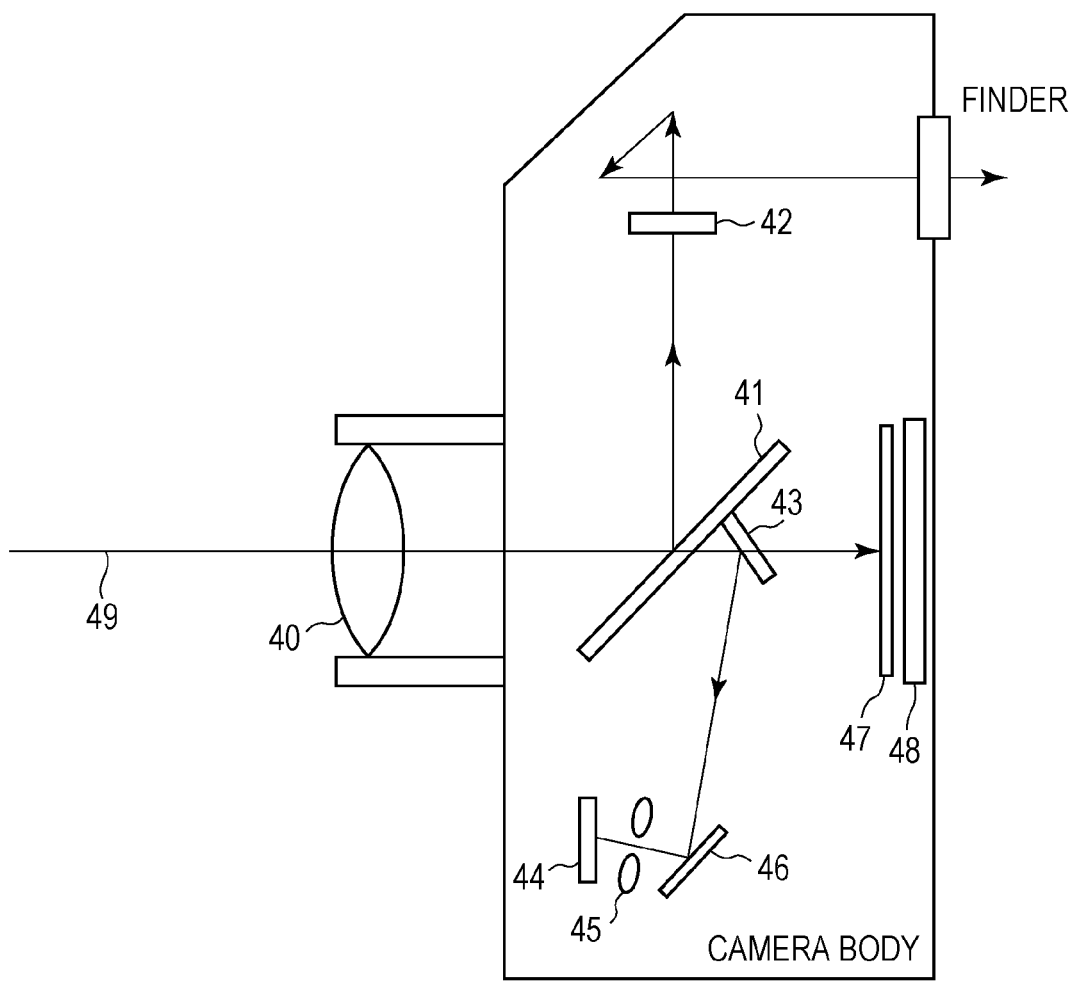
FIG. 15 is a schematic diagram illustrating an exemplary configuration of an image-pickup system according to a fifth embodiment of the present invention.

FIG. 15 illustrates a schematic diagram of the optical system of an image-pickup system equipped with a through the lens-secondary image registration (TTL-SIR)-type autofocus system including a photoelectric-conversion device according to an embodiment of the present invention. The present embodiment exemplarily illustrates a single-lens reflex camera.

FIG. 15 illustrates a lens 40 provided to primarily form the subject image on a film and/or an image sensor and a quick-return mirror 41 provided to return light to a finder screen 42, where the quick-return mirror 41 is a half mirror allowing several tens of percent of light to pass therethrough. FIG. 15 also illustrates a submirror 43 provided to guide the light to the AF system, a photoelectric-conversion device (AF sensor) 44 according to an embodiment of the present invention, secondary image-forming lenses (glass lenses) 45 that are provided to form the subject image on the AF sensor 44 again, a reflection mirror 46 provided to guide the light to the AF sensor 44, a focal-plane shutter 47, a film or an image sensor 48, and the principal axis of a light beam, which is designated by the reference numeral 49.

The present embodiment allows for achieving an image-pickup system with an appropriate dynamic range without decreasing the focusing speed through the use of the photoelectric-conversion device relating to the first embodiment or the second embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-275913 filed on Dec. 3, 2009 and Japanese Patent Application No. 2010-183050 filed on Aug. 18, 2010, which are hereby incorporated by reference herein in their entirety.

What is claimed is:

1. A device comprising:
   a plurality of unit pixels including a sensor-cell unit configured to output a signal obtained by photoelectric conversion and selectively operate in low-sensitivity mode and high-sensitivity mode;
   a plurality of transfer units configured to transfer a signal output from a unit pixel;
   a monitoring unit configured to monitor the transferred signal;
   a detection unit configured to detect a maximum value and a minimum value of signals that are output from the transfer units;
   a first comparator configured to determine whether or not a difference between the maximum value and the minimum value exceeds a threshold value; and
   a second comparator configured to determine whether or not the maximum value reaches a first level,
   wherein when the difference does not exceed the threshold value and the maximum value reaches the first level before a predetermined time elapses after the monitoring period is started, the sensor-cell unit enters the low-sensitivity mode.

2. The device according to claim 1, wherein each transfer unit includes a clamp circuit configured to reduce a noise occurring in the sensor-cell unit.

3. The device according to claim 2, wherein the transfer unit includes a feedback path configured to transmit to the sensor-cell unit a signal with the reduced noise.

4. The device according to claim 1, wherein each unit pixel further includes a memory-cell unit configured to store the signal output from the transfer unit.

5. The device according to claim 1, wherein the sensor-cell unit enters the high-sensitivity mode at a start of a period where the monitoring unit monitors the signal output from the sensor-cell unit, the signal being output from each of the transfer units.

6. The device according to claim 5, wherein a unit pixel includes a plurality of memory-cell units storing a noise caused by initialization of the sensor-cell unit.

7. The device according to claim 6, wherein the plurality of memory-cell units are provided for one of the sensor-cell units.

8. The device according to claim 7, wherein, before the monitoring period, a noise caused by initialization of the sensor-cell unit in the low-sensitivity mode is stored in one of the memory-cell units via the transfer unit, and a noise caused by initialization of the sensor-cell unit in the high-sensitivity mode is stored in different one of the memory-cell units via the transfer unit.

9. The device according to claim 7, wherein, before the monitoring period, a noise caused by initialization of the sensor-cell unit is written into each of the memory-cell units at one time.

10. The device according to claim 1,
    wherein a unit pixel includes a photoelectric-conversion element and a capacitance element arranged in parallel with the photoelectric-conversion element,
    wherein the capacitance element is connected to the photoelectric-conversion element in the low-sensitivity mode, and
    wherein the capacitance element is disconnected from the photoelectric-conversion element in the high-sensitivity mode.

11. A device comprising:
    a plurality of unit pixels including a sensor-cell unit configured to output a signal obtained by photoelectric conversion and selectively operate in low-sensitivity mode and high-sensitivity mode;
    a plurality of transfer units configured to transfer a signal output from a unit pixel; and
    a monitoring unit configured to monitor the transferred signal,
    wherein the plurality of memory-cell units are provided for one of the sensor-cell units,
    wherein the sensor-cell unit enters the high-sensitivity mode at a start of a period where the monitoring unit monitors the signal output from the sensor-cell unit, the signal being output from each of the transfer units, wherein a unit pixel includes a plurality of memory-cell units storing a noise caused by initialization of the sensor-cell unit, wherein the plurality of memory-cell units are provided for one of the sensor-cell units, and wherein, before the monitoring period, a noise caused by initialization of the sensor-cell unit in the low-sensitivity mode is stored in one of the memory-cell units via the transfer unit, and a noise caused by initialization of the sensor-cell unit in the high-sensitivity mode is stored in different one of the memory-cell units via the transfer unit.

12. A device comprising:
a plurality of unit pixels including a sensor-cell unit configured to output a signal obtained by photoelectric conversion and selectively operate in low-sensitivity mode and high-sensitivity mode;
a plurality of transfer units configured to transfer a signal output from a unit pixel; and
a monitoring unit configured to monitor the transferred signal,
wherein the plurality of memory-cell units are provided for one of the sensor-cell units,
wherein the sensor-cell unit enters the high-sensitivity mode at a start of a period where the monitoring unit monitors the signal output from the sensor-cell unit, the signal being output from each of the transfer units,
wherein a unit pixel includes a plurality of memory-cell units storing a noise caused by initialization of the sensor-cell unit,
wherein the plurality of memory-cell units are provided for one of the sensor-cell units, and
wherein, before the monitoring period, a noise caused by initialization of the sensor-cell unit is written into each of the memory-cell units at one time.

13. An apparatus including the photoelectric-conversion device according to claim 1.

14. The apparatus according to claim 13, wherein each transfer unit includes a clamp circuit configured to reduce a noise occurring in the sensor-cell unit.

15. The apparatus according to claim 13, wherein each unit pixel further includes a memory-cell unit configured to store the signal output from the transfer unit.

16. The apparatus according to claim 13, wherein the sensor-cell unit enters the high-sensitivity mode at a start of a period where the monitoring unit monitors the signal output from the sensor-cell unit, the signal being output from each of the transfer units.

17. An image-pickup system including the apparatus according to claim 13.

18. The system according to claim 17, wherein each transfer unit includes a clamp circuit configured to reduce a noise occurring in the sensor-cell unit.

19. The system according to claim 17, wherein each unit pixel further includes a memory-cell unit configured to store the signal output from the transfer unit.

20. The system according to claim 17, wherein the sensor-cell unit enters the high-sensitivity mode at a start of a period where the monitoring unit monitors the signal output from the sensor-cell unit, the signal being output from each of the transfer units.

* * * * *